April 9, 1946.     S. E. HEYMANN     2,398,094
CARBURETOR ANTI-ICING DEVICE
Filed March 1, 1943     2 Sheets-Sheet 2
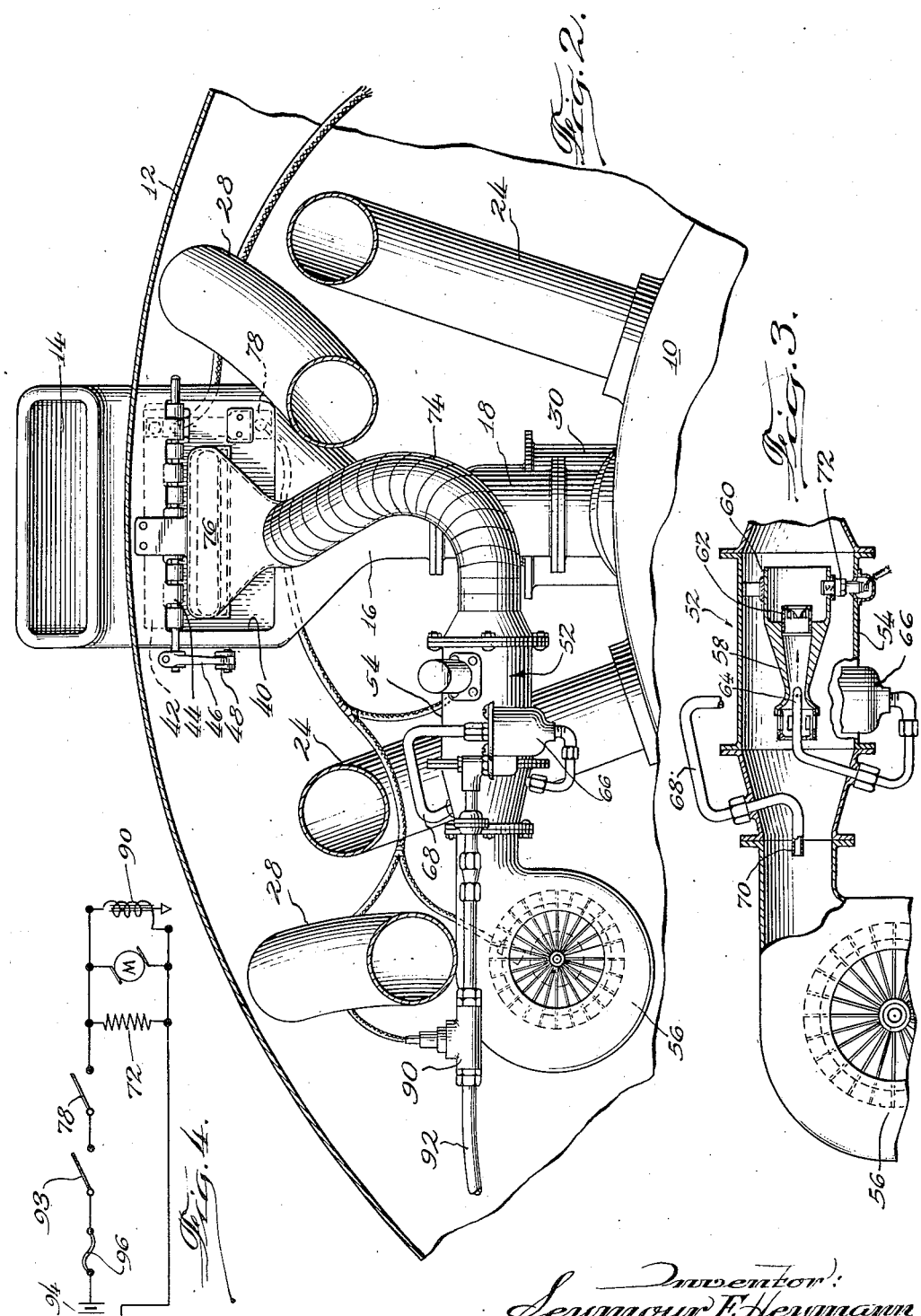

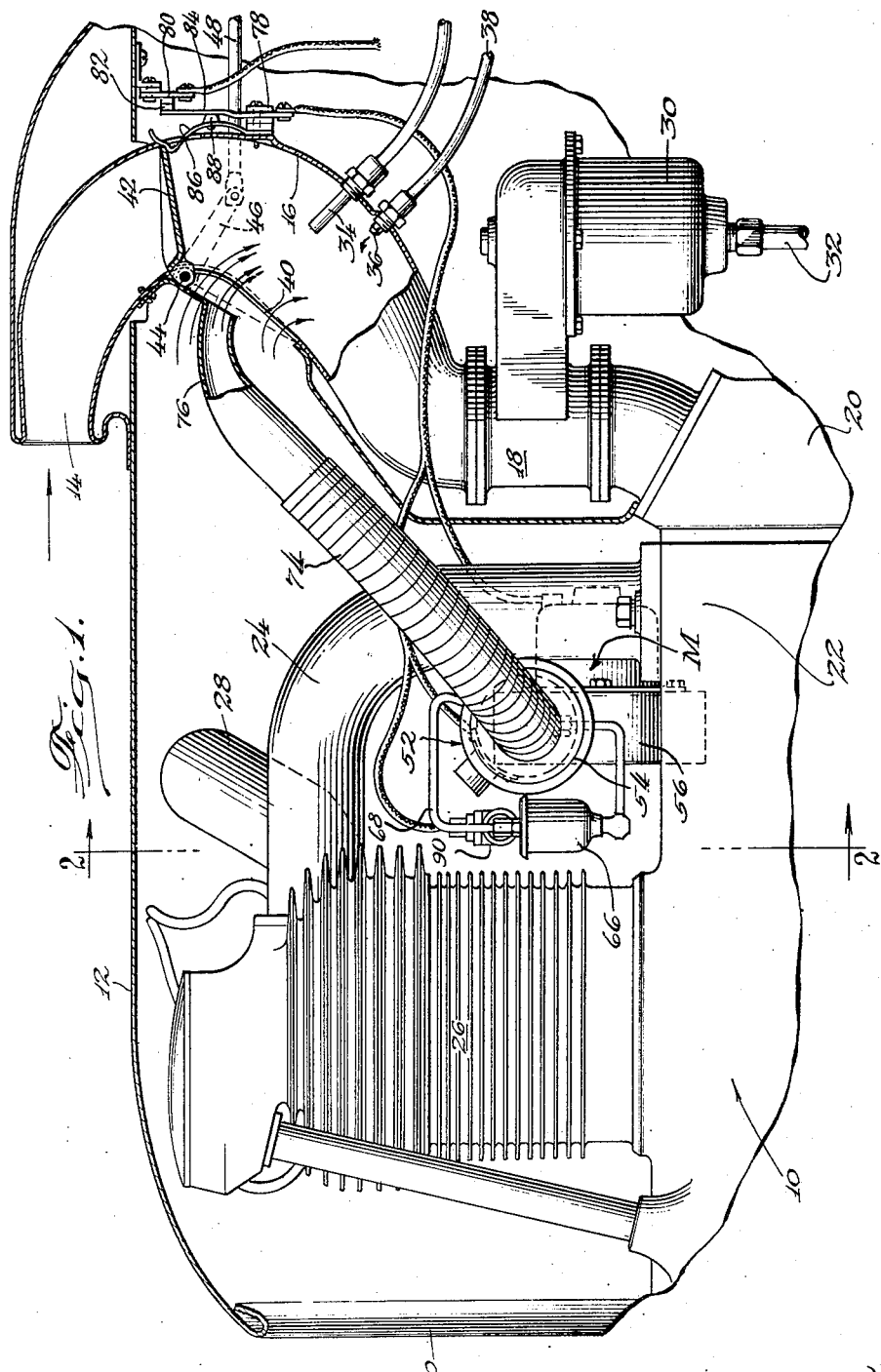

Patented Apr. 9, 1946

2,398,094

UNITED STATES PATENT OFFICE 2,398,094

CARBURETOR ANTI-ICING DEVICE

Seymour E. Heymann, Chicago, Ill., assignor to Stewart-Warner Corporation, Chicago, Ill., a corporation of Virginia Application March 1, 1943, Serial No. 477,524

6 Claims. (Cl. 123—122)

My invention relates to carburetor anti-icing devices, and is more particularly concerned with an anti-icing device for the carburetors of aircraft engines.

In aircraft operation the temperature of the atmospheric air varies greatly with different altitudes and different weather conditions, and great difficulty is encountered with the formation of ice in the carburetor of the aircraft engine. While various means have been proposed to overcome these difficulties, none of the solutions heretofore proposed are entirely satisfactory.

An object of my invention is to provide an anti-icing device for aircraft carburetors which will operate satisfactorily under the most severe conditions, which is simple, inexpensive, light in weight and easy to install.

Another object of my invention is to provide an anti-icing device for aircraft carburetors which requires no additional operation on the part of the pilot of the aircraft.

Another object of my invention is to provide a carburetor anti-icing device which may use fuel from the main fuel supply for the aircraft engine or which may have its own source of fuel supply.

Another object of my invention is to provide a carburetor anti-icing device which consumes no additional fuel or electricity when not in use.

Another object of my invention is to provide a carburetor anti-icing device which utilizes an internal combustion heater for supplying the heat necessary to prevent the formation of ice in the carburetor.

Other objects and advantages will become apparent as the description proceeds.

In the drawings:

Fig. 1 is a partial sectional view through the cowling of a conventional aircraft engine installation showing my invention applied thereto;

Fig. 2 is the partial vertical section taken on the line 2—2 in Fig. 1;

Fig. 3 is a sectional view through the burner forming a part of my invention; and Fig. 4 is a wiring diagram.

In Fig. 1, I have illustrated a typical installation of a radial air cooled engine 10 for aircraft. The engine 10 is enclosed in a cowling 12, and the air supply for the engine carburetor normally enters an inlet 14 located outside of the cowling 12. The inlet 14 connects with a pipe 16 leading to the engine carburetor 18 which forms a combustible mixture delivered by the carburetor to the inlet 20 of the engine supercharger.

The supercharger 20 has a circular blower case 22 which is connected by intake manifolds 24 to the individual engine cylinders, such as the cylinder 26 shown in Fig. 1. Each cylinder is provided with an exhaust pipe 28 which projects through the cowling 14 and discharges the exhaust gases directly to atmosphere or into any suitable exhaust manifold.

The carburetor 18 may be of any suitable or common type and receives a supply of fuel from a float bowl 30 connected by a pipe 32 to the engine fuel tank. A thermometer bulb 34 projects into the pipe 16 and is connected to a suitable indicator on the instrument board of the aircraft to indicate to the pilot the temperature of the air flowing to the carburetor 18. A nozzle 36 is located in the pipe 16 and is connected by tube 38 to a hand operated force pump for forcing alcohol in a spray form into the pipe 16 to dissolve any ice which has formed in the engine carburetor. The thermometer 34 and nozzle 36 are conventional equipment and form no part of my invention. It is only feasible to spray alcohol into the carburetor inlet pipe 16 at infrequent intervals, and the provision of equipment for so doing does not constitute a satisfactory solution of the icing problem. While I have shown the inlet pipe for the carburetor as being equipped with the alcohol nozzle 36, this nozzle is not necessary in installations using my invention.

The carburetor inlet pipe 16 is provided with an opening 40 in the forward wall thereof, and this opening is normally closed by a shutter 42. The shutter 42 is pivoted at 44 and has an arm 46 connected to a rod 48 extending into the pilot's compartment. When the thermometer 34 indicates that the air entering the inlet 14 is within a given temperature range, the pilot shifts the shutter 42 to the position shown in Fig. 1. This prevents any air from reaching the carburetor by way of the inlet 14, and permits air from the inside of the engine cowling 12 to flow to the carburetor by way of opening 40 and pipe 16. While the air entering the open end 50 of the cowling 12 is heated somewhat as it passes over the engine 10, the heat which this air receives from the engine is insufficient under some conditions to raise the temperature of the air flowing to the carburetor enough to prevent the formation of ice in this carburetor. I therefore provide additional means for increasing the temperature of the air and reaching the carburetor by way of opening 40 in the pipe 16.

This additional means is in the form of an internal combustion heater indicated generally by reference character 52. The heater 52 has a cylindrical casing 54 into which air is forced by a blower 56 which is preferably operated from a small electric motor but which may be driven in any other suitable manner. While I have shown my heater as being supplied with air by a blower, a ram or any other suitable source of air supply could be utilized.

A Venturi tube 58 is located in the casing 54 and delivers a combustible mixture to a combustion chamber 60 through a burner tube 62. A fuel jet 64 is located in the restricted throat of the Venturi tube 58 and supplies fuel thereto from a float bowl 66. The upper part of the float bowl is connected by a pipe 68 to a ram 70 in the path of air discharge by the blower 56 so that the difference in pressure between the ram 70 and throat of the Venturi tube 58 is available to cause fuel to flow from the float bowl 66 to the jet 64 and pass through the openings of this jet to the interior of the Venturi tube.

The combustible mixture entering the combustion chamber 60 by way of the burner tube 62 is ignited by an electrical igniter 72. Only part of the air discharged by the blower 56 enters the Venturi tube 58 to form the combustible mixture burned in the combustion chamber 60. The remainder of the air discharged by the blower 58 flows around the combustion chamber 60 and mixes with the hot products of combustion discharged from the open righthand end of this combustion chamber. The heated gas and air from the burner 52 passes through a flexible hose 74 to the discharge nozzle 76 located immediately in front of the opening 40 in the carburetor air inlet pipe 16. When the shutter 42 is in the position shown in Fig. 1, the hot mixture of air and burned gases discharged by the nozzle 76 flows into pipe 16 along with additional air from the interior of the cowling 12. Such additional air has received some heat from the engine 10 and the additional heat supplied by the burner 52 raises the temperature of the air flowing to the carburetor 18 sufficiently to prevent the formation of ice therein under all operating conditions.

In the embodiment shown in the drawings, the heater 52 is automatically set in operation whenever the shutter 42 is shifted to the position shown in Fig. 1. The heater remains in operation as long as the shutter remains in this position unless a manual switch is operated to disconnect the electrical control circuit from its source of electrical energy. When the shutter 42 is shifted to close the opening 40, the heater is automatically cut out.

The foregoing automatic operation is effected by means of a switch 78 having a fixed contact 80 and a movable contact 82 mounted on an arm 84. The arm 84 is biased so that it normally tends to move the contact 82 out of engagement with the contact 80. A spring 86 projects into the path of the shutter 42, and when the shutter is moved to the position shown in Fig. 1, the upper end of the spring 86 is flexed to the right so that the projection 88 carried by the central portion of this spring forces movable contact 82 into engagement with contact 80. As soon as the shutter 42 is moved to a position closing opening 40, the upper ends of spring 86 and switch arm 84 move to the left, thereby breaking the circuit through the switch 78.

In the wiring diagram of Fig. 4, the motor for driving the blower is indicated by the letter M. This motor is in parallel with the igniter 72 and the solenoid valve 90 which controls the flow of fuel through pipe 92 which connects float bowl 66 with the fuel tank for the engine 10 or with any other suitable source of fuel supply. This solenoid valve is biased toward closed position and is open only as long as the solenoid is electrically energized. A manual switch 93 is preferably provided in the circuit connecting the igniter, blower motor and solenoid valve with a suitable source of electrical energy, such, for example, as the battery 94. A fuse 96 or other overload device is also preferably located in this circuit. The manual switch 93 is normally closed when the aircraft is in operation, and the heater 52 is automatically controlled by the shifting movements of the shutter 42.

From the foregoing it will be apparent that I have provided an exceedingly simple, inexpensive, compact and efficient anti-icing device for aircraft carburetors, and that the control of this device requires no additional attention or operation on the part of the aircraft pilot. The starting and stopping of the burner of the anti-icing device is automatically controlled by the shifting of a shutter which is a part of the standard equipment of the aircraft and forms one of the usual controls therefor. My anti-icing device can be mounted in space which is not used for any other purpose, and can be easily and quickly installed upon existing aircraft.

While I have illustrated only one form of my invention, it is to be understood that my invention is not limited to the details shown and described but may assume numerous other forms, and that the scope of my invention is defined by the following claims.

I claim:

1. An anti-icing device for the carburetor of an aircraft engine mounted in a cowling and having one carburetor air inlet outside of said cowling and another carburetor air inlet inside of said cowling and a shutter for controlling admission of air through said inlets, said device comprising a burner mounted in said cowling, an electrically operated blower in said cowling for supplying air to said burner, an electrically operated fuel valve for controlling flow of fuel to said burner, an electrically operated igniter for said burner, a hose for conducting hot gases from said burner to said inlet located in said cowling, and switch means automatically operated by said shutter for controlling said igniter, fuel valve, and blower.

2. An anti-icing device for the carburetor of an airplane engine mounted in a cowling, said device comprising an inlet pipe for said carburetor, said inlet pipe having one air admission inlet outside of said cowling and another air admission inlet inside of said cowling, a burner located in said cowling, a discharge tube for said burner, a nozzle on the end of said discharge tube, means for supporting said nozzle to discharge into the opening located in said cowling, means for varying admission of air through said openings, and a burner control operated by said last named means for starting and stopping said burner.

3. An aircraft engine installation, comprising an internal combustion engine, a carburetor for said engine, a cowling enclosing said engine, a carburetor air inlet located outside of said cowling, another carburetor air inlet located inside of said cowling, a shutter for controlling admission of air through said inlets, a burner for delivering hot products of combustion to one of said inlets, means for shifting said shutter, and means operated by said shutter for starting and stopping said burner.

4. In an arrangement of the type described, the combination of an internal combustion engine, a carburetor for said engine arranged to the rear of the engine so as to receive heat therefrom and having two air inlets, a heater connected with one of said inlets and adapted independently of said engine to supply heated gas thereto, means for closing either of said inlets while leaving the other open, and means adapted automatically to start said heater into operation when the inlet connected with the heater is opened.

5. In an arrangement of the type described, the combination of an internal combustion engine, a carburetor for said engine arranged to the rear of the engine so as to receive heat therefrom and having two air inlets, means comprising a heater operating independently of said engine and connected with one of said inlets and adapted to deliver heated air and combustion gases thereto, means for closing either of said inlets while leaving the other open, and means adapted automatically to start said heater into operation when the inlet connected with the heater is opened.

6. In an arrangement of the type described, the combination of an internal combustion engine, a cowling enclosing said engine, a carburetor for said engine arranged inside of said cowling to the rear of the engine so as to receive heat from the engine and having two air inlets, means comprising a heater operating independently of said engine and connected with one of said inlets and adapted to deliver heated air and combustion gases to said inlet, means for closing either of said inlets while leaving the other open, and means adapted automatically to start said heater into operation when the inlet connected with the heater is opened and to throw said heater out of operation when said inlet is closed.

SEYMOUR E. HEYMANN.